United States Patent
Wan et al.

(10) Patent No.: US 9,654,363 B2
(45) Date of Patent: May 16, 2017

(54) SYNTHETIC LOSS MEASUREMENTS USING SESSION NUMBERS

(71) Applicant: Fujitsu Limited, Kawasaki-shi, Kanagawa (JP)

(72) Inventors: Calvin Wan, Plano, TX (US); Kumaravel Senthivel, Murphy, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/069,594

(22) Filed: Mar. 14, 2016

(65) Prior Publication Data
US 2016/0197810 A1 Jul. 7, 2016

Related U.S. Application Data

(62) Division of application No. 13/860,365, filed on Apr. 10, 2013, now Pat. No. 9,294,373.

(51) Int. Cl.
*H04L 12/26* (2006.01)

(52) U.S. Cl.
CPC ............................... *H04L 43/0835* (2013.01)

(58) Field of Classification Search
CPC ............ H04L 43/10; H04L 43/50; H04Q 7/34
See application file for complete search history.

(56) References Cited

U.S. PATENT DOCUMENTS

| | | | | |
|---|---|---|---|---|
| 6,208,859 B1 * | 3/2001 | Halvorson | ......... | H04B 7/18567 340/988 |
| 6,279,041 B1 * | 8/2001 | Baber | ..................... | H04L 47/10 370/235 |
| 7,363,307 B1 * | 4/2008 | Yamagishi | ........ | G06F 17/30067 |
| 8,229,705 B1 * | 7/2012 | Mizrahi | .................. | H04L 43/08 370/236.2 |
| 8,341,231 B2 | 12/2012 | Wan | | |
| 2008/0095134 A1 * | 4/2008 | Chen | .................... | H04B 7/2606 370/342 |

(Continued)

OTHER PUBLICATIONS

Recommendation ITUT-T G.8013/Y.1731; "OAM Functions and Mechanisms for Ethernet Based Networks"; Tellecommunication Standardization Sector of ITU; pp. 92, 2011.

(Continued)

*Primary Examiner* — Jung Park
*Assistant Examiner* — Zhiren Qin
(74) *Attorney, Agent, or Firm* — Baker Botts L.L.P.

(57) ABSTRACT

A method and system for performing synthetic loss measurements (SLM) includes methods for single-ended and dual-ended synthetic loss measurements. The methods include maintaining a session number indicative of a physical network component at each maintenance point used to perform synthetic loss measurements. The session numbers are maintained according to a novel protocol and are used to detect a change in the network component, such as resulting from a protection switch event. The session numbers enable the synthetic loss measurements to continue irrespective of changes in the values for the session numbers and to remove errors when computing frame loss that may arise when physical network components change. The disclosed methods and systems may be used when a link aggregation group exists between a local maintenance point and a remote maintenance point.

16 Claims, 10 Drawing Sheets

(56) References Cited

U.S. PATENT DOCUMENTS

| | | | | |
|---|---|---|---|---|
| 2009/0060094 A1* | 3/2009 | Jung | .................. | H04B 1/69 375/340 |
| 2010/0067367 A1* | 3/2010 | Choi | .................. | H04L 5/0064 370/210 |
| 2010/0069083 A1* | 3/2010 | Wei | .................. | H04W 72/085 455/452.2 |
| 2010/0302949 A1* | 12/2010 | Fukagawa | .......... | H04L 43/0841 370/241.1 |
| 2011/0158112 A1* | 6/2011 | Finn | .................. | H04L 12/2697 370/252 |
| 2012/0236734 A1* | 9/2012 | Sampath | .............. | H04L 12/413 370/252 |
| 2012/0269086 A1* | 10/2012 | Yue | .................. | H04L 1/203 370/252 |
| 2013/0051243 A1 | 2/2013 | Senthivel | | |
| 2013/0051568 A1* | 2/2013 | Sugiura | ................ | H04L 65/602 381/56 |
| 2013/0091408 A1* | 4/2013 | O'Connell | ......... | H04L 41/5009 714/819 |
| 2013/0329565 A1* | 12/2013 | Holness | ............. | H04L 43/0811 370/241.1 |
| 2014/0029609 A1* | 1/2014 | Ayandeh | .............. | H04L 49/357 370/389 |

OTHER PUBLICATIONS

MEF-CECP Sudy Guide, Metro Ethernet forum; www.carrierethernetstudyguide.org; pp. 410, 2012.

\* cited by examiner

SYNTHETIC LOSS MEASUREMENTS USING SESSION NUMBERS

CROSS REFERENCE TO RELATED APPLICATION

This application is a divisional application of U.S. patent application Ser. No. 13/860,365 filed Apr. 10, 2013, the contents of which is hereby incorporated in its entirety by reference.

BACKGROUND

Field of the Disclosure

The present disclosure relates to communications systems and more specifically to synthetic loss measurements using session numbers.

Description of the Related Art

A communication network may include network elements that route packets through the network. Some network elements may include a distributed architecture, wherein packet processing may be distributed among several subsystems of the network element (e.g., line cards).

Service Operation, Administration, and Management ("Service OAM" or "SOAM"), is defined by ITU-T Y.1731/IEEE 802.1ag and defines Maintenance Entity Group End Points (MEPs) and Maintenance Entity Group Intermediate Points (MIPs) that may be provisioned on a network element. Throughout this disclosure, MEPs and MIPs may generally be referred to as "maintenance points." A maintenance point may be associated with a particular maintenance level (e.g., 0 to 7) and may be configured to communicate traffic to a peer maintenance point at the same maintenance level that resides in the communication network. The maintenance entities of a maintenance entity group are maintenance points comprising end points (e.g., MEPs) and intermediate points (e.g., MIPs). The maintenance points may represent entities that are provisioned within a network element. An end point is a maintenance functional entity implemented at the ends of a maintenance entity group. An end point may generate and receive packets such as OAM frames. An intermediate point represents a maintenance functional entity between end points. An intermediate point responds to packets received from end points and may forward these packets to downstream intermediate points and end points.

From time to time, maintenance points may perform data loss measurements to characterize network performance between two or more MEPs. The data loss measurements may be employed using payload data or using synthetic data, the latter of which is also referred to as synthetic loss measurement (SLM) as specified by ITU Y.1731. During synthetic loss measurement, synthetic data frames are transmitted between at least two MEPs and are counted by at least one receiving MEP. By counting the actual number of transmitted and received synthetic data frames during a measurement period, a frame loss ratio and/or other frame loss parameter may be determined and may be used to characterize performance of the measured network segment.

In various embodiments, network elements may also employ link aggregation. Link aggregation (e.g., as specified by IEEE 802.1AX-2008) may generally describe the practice of using multiple network cables or ports in parallel to increase the link speed beyond the limits of any one single cable or port, and to increase redundancy for higher availability. In link aggregation, a group or set of ports may be combined and represented as a single logical port to other components of the network system. Various switching elements of the network system may "see" the aggregated ports (known as a "link aggregation group" or "LAG") as a single logical communication port in the routing tables or databases of network elements external to the LAG.

In equipment that is undergoing a conventional synthetic loss measurement, a lack of statefulness among MEPs may result in measurement errors. This kind of measurement error may occur in various kinds of network equipment and particularly when the transmitting and receiving MEPs do not otherwise share state information with each other.

SUMMARY

In one aspect, a disclosed method for performing dual-ended synthetic loss measurements includes maintaining, at a local maintenance point, a transmitting session number for a first interface component associated with the local maintenance point and a receiving session number for a second interface component associated with a remote maintenance point, and receiving, at the first interface component, a first one-way synthetic loss (1SL) frame from the second interface component. The first 1SL frame may include a first session number indicative of the second interface component. When the first session number does not equal the receiving session number, the method may include copying the first session number to the receiving session number, and resetting an incoming frame count at the local maintenance point. The incoming frame count may be indicative of a number of 1SL frames received from the second interface component.

In some embodiments, the method includes detecting deactivation of the first interface component and activation of a third interface component associated with the local maintenance point. The operation of detecting may include assigning a second session number to the third interface component, and assigning a third session number to the first interface component. The second session number and the third session number may be different from the transmitting session number. Responsive to receiving, from the second interface component, a second 1SL frame including the first session number, at the third interface component, the method may include determining when at least one session condition is true. The session conditions may be selected from the following session conditions: the second session number does not equal the transmitting session number, and the first session number does not equal the receiving session number. When at least one of the session conditions is true, the method may include copying the second session number to the transmitting session number, and copying the first session number to the receiving session number.

In particular embodiments, the method may include detecting reactivation of the first interface component and deactivation of the third interface component, while the first interface component replaces the third interface component. The method may include copying the third session number to the transmitting session number. The method may also include sending, from the first interface component, a third 1SL frame to the second interface component, while the third synthetic frame may include the transmitting session number. The receiving the first synthetic frame and the sending the third synthetic frame may be performed irrespective of changes to the transmitting session number and the receiving session number. The method may still further include calculating a frame loss parameter based on frame count values, including the incoming frame count, for a measurement period, while the frame count values used to calculate the frame loss parameter may be associated with identical values for the transmitting session number and with identical values for the receiving session number. The frame count values used to calculate the frame loss parameter may be associated with identical values for a test identification parameter. The first interface component and the third interface component may be network interface cards comprising a plurality of network ports. The first interface component and the third interface component may be network ports. The first 1SL frame may be a 1SL message that includes the first session number in an organization-specific type, length, and value (TLV) field in accordance with the International Telecommunication Union (ITU) Y.1731 standard. A network segment transmitting the first 1SL frame between the first network element and the second network element may include at least one link aggregation group (LAG).

Additional disclosed aspects for performing dual-ended synthetic loss measurements include a system and an article of manufacture comprising non-transitory computer readable memory media storing processor-executable instructions.

In another aspect, a disclosed method for performing single-ended synthetic loss measurements includes maintaining, at a local maintenance point, a transmitting session number for a first interface component associated with the local maintenance point and a receiving session number for a second interface component associated with a remote maintenance point, and sending, from the first interface component, a first synthetic loss message to the second interface component. The first synthetic loss message may include a first session number indicative of the first interface component. The method may include receiving, at the first interface component, a first synthetic loss response from the second interface component. The first synthetic loss response may include a second session number and a third session number indicative of the second interface component. When the third session number does not equal the receiving session number, the method may include copying the third session number to the receiving session number.

In some embodiments, the method may include detecting deactivation of the first interface component and activation of a third interface component associated with the local maintenance point, while the third interface component replaces the first interface component. The method operations of detecting replacement may include assigning a fourth session number to the third interface component, and assigning a fifth session number to the first interface component. The fourth session number and the fifth session number may be different from the transmitting session number. The method may include sending, from the third interface component, a second synthetic loss message to the second interface component. The second synthetic loss message may include the fourth session number indicative of the third interface component. Responsive to receiving, from the second interface component, a second synthetic loss response at the third interface component, while the second synthetic loss response may include a sixth session number and a seventh session number indicative of the second interface component, and when the sixth session number does not equal the transmitting session number, the method may further include copying the sixth session number to the transmitting session number.

In particular embodiments, the method may include calculating a frame loss parameter based on frame count values for a measurement period, while the frame count values used to calculate the frame loss parameter are associated with identical values for the transmitting session number and with identical values for the receiving session number. The frame count values used to calculate the frame loss parameter may be associated with identical values for a test identification parameter. The method operations of sending the first synthetic loss message and the receiving the first synthetic loss response may be performed irrespective of changes to the transmitting session number and the receiving session number. The first interface component and the third interface component may be network interface cards comprising a plurality of network ports. The first interface component and the third interface component may be network ports. The first synthetic loss message may include the first session number in an organization-specific type, length, and value (TLV) field in accordance with the International Telecommunication Union (ITU) Y.1731 standard. The first synthetic loss response may respectively include each of the second session number and the third session number in an organization-specific type, length, and value (TLV) field in accordance with the International Telecommunication Union (ITU) Y.1731 standard.

In different embodiments, the method operation of sending, from the first interface component, the first synthetic loss message may include sending the first synthetic loss message to a plurality of interface components associated with a respective plurality of remote maintenance points, the plurality of interface components including the second interface component. A network segment transmitting the first synthetic loss message between the first interface component and the second interface component may include at least one link aggregation group (LAG).

Additional disclosed aspects for performing single-ended synthetic loss measurements include a system and an article of manufacture comprising non-transitory computer readable memory media storing processor-executable instructions.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
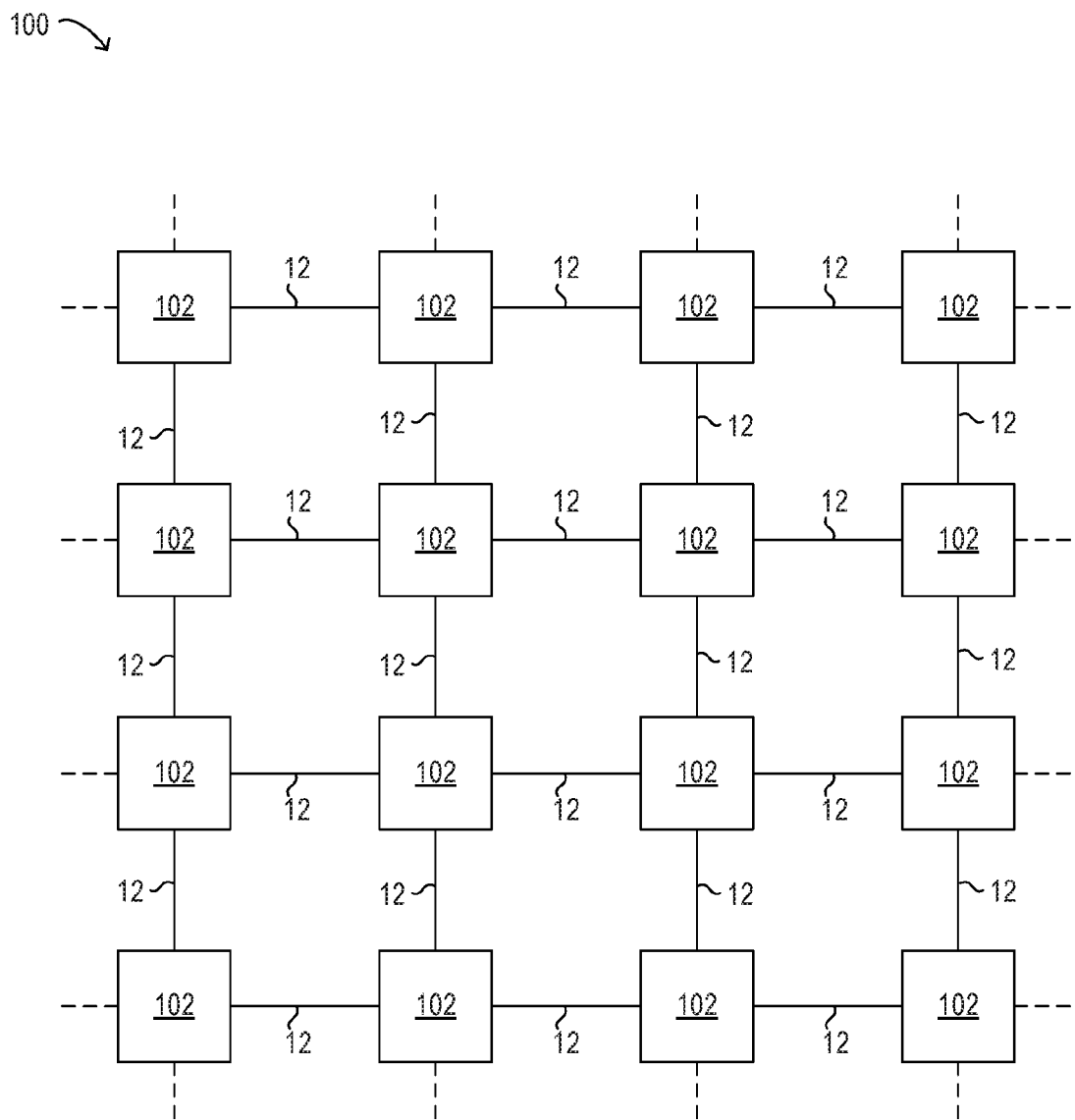
FIG. 1 is a block diagram of selected elements of an embodiment of a network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget 12-1 refers to an instance of a widget class, which may be referred to collectively as widgets 12 and any one of which may be referred to generically as a widget 12.

Turning now to the drawings, FIG. 1 is a block diagram showing selected elements of an embodiment of network 100. In certain embodiments, network 100 may be an Ethernet network. Network 100 may include one or more transmission media 12 operable to transport one or more signals communicated by components of network 100. The components of network 100, coupled together by transmission media 12, may include a plurality of network elements 102. In the illustrated network 100, each network element 102 is coupled to four other nodes. However, any suitable configuration of any suitable number of network elements 102 may create network 10. Although network 100 is shown as a mesh network, network 100 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium.

Network 100 may communicate information or "traffic" over transmission media 12. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may be transmitted deterministically (also referred to as 'real-time') and/or stochastically. Traffic may be communicated via any suitable communications protocol, including, without limitation, the Open Systems Interconnection (OSI) standard and Internet Protocol (IP). Additionally, the traffic communicated via network 100 may be structured in any appropriate manner including, but not limited to, being structured in frames, packets, or an unstructured bit stream.

Each network element 102 in network 100 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

For purposes of SOAM, a service provider operating network 100 may desire to characterize performance of network 100. For example, a service agreement with an end user (not shown) may specify a certain level of performance, such as in terms of data throughput, latency, and data errors. The actual network performance provided by network 100 may be associated with financial considerations for the service provider. For at least such purposes, the service provider may seek to measure, at least from time to time, a number of data frames that are lost when transmitted across network 100.

For the purposes of characterizing frame (or packet) loss within networks, such as network 100, the International Telecommunication Union (ITU) has published standards (Y.1731) for performing frame loss measurements. One type of frame loss measurement described by Y.1731 is a synthetic loss measurement (SLM) where synthetic (i.e., artificial) frames are inserted between at least two MEPs and are counted by a receiving MEP, as will be described in further detail herein.

Figure 2:
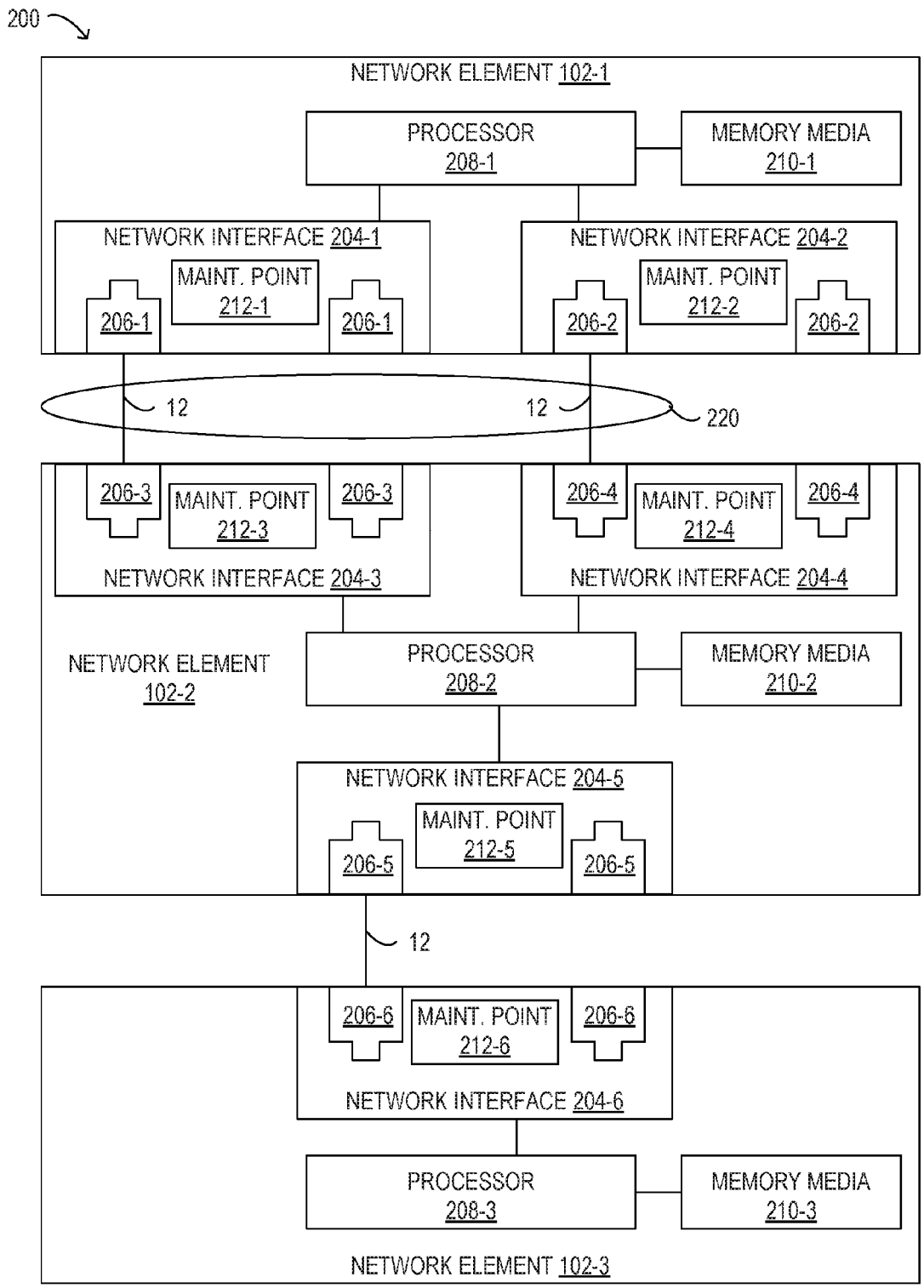
FIG. 2 is a block diagram of selected elements of a network segment including a link aggregation group.

Referring now to FIG. 2, a block diagram of selected elements of an embodiment of network segment 200 is illustrated. Network segment 200 may represent a portion of network 100 (see FIG. 1). Although network segment 200 is depicted with three network elements 102 for descriptive clarity in FIG. 2, it is understood that network segment 200 may include any number of network elements 102. As shown, network segment 200 may represent a network segment formed between network element 102-1 and network element 102-2, as well as a network segment formed between network element 102-2 and network element 102-3. Network element 102-1 includes processor 208-1 and memory media 210-1, along with network interface 204-1 having ports 206-1 and network interface 204-2 having ports 206-2. Network interface 204-1 may be provisioned with maintenance point 212-1, while network interface 204-2 may be provisioned with maintenance point 212-2. When network element 102-1 (or a component thereof) is configured as an end point in a maintenance entity group, maintenance points 212-1 and 212-2, either individually or in combination, may instantiate a MEP. Network element 102-2, which is an intermediate network element in network segment 200, includes processor 208-2 and memory media 210-2, along with network interface 204-3 having ports 206-3, network interface 204-4 having ports 206-4, and network interface 204-5 having ports 206-5. Network interface 204-3 may be provisioned with maintenance point 212-3, network interface 204-4 may be provisioned with maintenance point 212-4, and network interface 204-5 may be provisioned with maintenance point 212-5. As shown, network element 102-2 may be an intermediate point in a maintenance entity group such that maintenance points 212-3, 212-4, and 212-5 may instantiate MIPs. Network element 102-3 includes processor 208-3 and memory media 210-3, along with network interface 204-6 having ports 206-6. Network interface 204-6 may be provisioned with maintenance point 212-6. When network interface 204-6 (or a component thereof) is configured as an endpoint in a maintenance entity group, maintenance point 212-6 may instantiate a MEP.

As depicted in FIG. 2, each network element 102 may include processor 208 and memory media 210 that may store instructions executable by processor 208. As shown, memory media 210 may represent volatile, non-volatile, fixed, and/or removable media, and may be implemented using magnetic and/or semiconductor memory. Memory media 210 is capable of storing instructions (i.e., code executable by processor 208) and/or data. Memory media 210 and/or at least a portion of contents of memory media 210 may be implemented as an article of manufacture comprising non-transitory computer readable memory media storing processor-executable instructions. Memory media 210 may store instructions including an operating system (OS), which may be any of a variety of operating systems, such as a UNIX variant, LINUX, a Microsoft Windows® operating system, or a different operating system. It is noted that network interface 204 may also include a processor and memory media (not shown) in certain embodiments. A processor and memory included with network element 102, such as processor 208 and memory media 210 or another processor and memory media, may implement novel methods for synthetic loss measurements as described herein (see also FIGS. 3A-3C, 4A-4C, 5, and 6).

In FIG. 2, network elements 102 are shown including at least one network interface 204, which provides a plurality of ports 206 that receive a corresponding transmission media 12 (see also FIG. 1). Ports 206 and transmission media 12 may represent galvanic and/or optical network connections. Each network interface 204 may include any suitable system, apparatus, or device configured to serve as an interface between a network element 102 and transmission medium 12. Each network interface 204 may enable its associated network element 102 to communicate with other network elements 102 using any of a variety of transmission protocols and/or standards. Network interface 204 and its various components may be implemented using hardware, software, or any combination thereof. In certain embodiments, network interfaces 204 may include a network interface card. In various embodiments, network interfaces 204 may include a line card. Each port 206 may include a system, device or apparatus configured to serve as a physical interface between corresponding transmission medium 12 and network interface 204. In some embodiments, port 206 may comprise an Ethernet port. Although in FIG. 2 network interfaces 204 are shown with 2 instances of ports 206 for descriptive clarity, in different embodiments, network interfaces 204 may be equipped with different numbers of ports 206 (e.g., 4, 6, 8, 16 ports, etc.). In various embodiments, network element 102 may be configured to receive data and route such data to a particular network interface 204 and/or port 206 based on analyzing the contents of the data and/or based on a characteristic of a signal carrying the data (e.g., a wavelength and/or modulation of the signal). In certain embodiments, network element 102 may include a switching element (not shown) that may include a switch fabric (SWF).

As shown in FIG. 2, network segment 200 may represent at least a portion of a network channel in network 100 (see FIG. 1) that includes link aggregation group (LAG) 220, formed between network element 102-1 and network element 102-2. Although network segment 200 is shown with a single intermediate network element (network element 102-2), in practice a number of intermediate network elements and corresponding channel segments may be implemented in various embodiments. As shown in FIG. 2, one of port 206-1 of network element 102-1 and one of port 206-2 of network interface 204-2 and the corresponding transmission media 12 are grouped into LAG 220. While LAG 220 is depicted in FIG. 2 as including two of member ports 206 for descriptive purposes, it is noted that in various embodiments, LAG 220 may include any suitable number of member ports 206. LAG 220 may combine its member ports or member LAGs using link aggregation such that the member ports are represented as a single logical port of network segment 200. Also, while LAG 220 is shown in a particular network arrangement in FIG. 2, in different embodiments, LAG 220 may be implemented using different network arrangements and/or topologies. In the embodiment shown in FIG. 2, LAG 220 may appear as a single logical port to processor 208-1 of network element 102-1 and/or to processor 208-2 of network element 102-2. As noted, various implementations and/or configurations of LAG 220 using at least one intermediate network element may be used in particular embodiments.

In operation of network segment 200 to perform conventional synthetic loss measurements, for example, between maintenance points 212-1, 212-2 (referred to collectively as MEP1) and maintenance point 212-6 (referred to as MEP2), a lack of statefulness between MEP1 and MEP2 may result in measurement errors in certain instances. (It is noted that intermediate maintenance points 212-3, 212-4, and 212-5, when configured as MIPs, may operate transparently with respect to synthetic loss measurements and may be configured to pass through synthetic data used during synthetic loss measurements and, accordingly, may not originate and/or evaluate synthetic data frames.) Specifically, when LAG 220 undergoes an event that causes ports 206-1, 206-2 and/or network interfaces 204-1, 204-2 to be reconfigured with different physical connections and/or hardware, the newly connected components may not be aware of a previous state of an ongoing synthetic loss measurement in which maintenance points 212-1, 212-2 serve as MEP1. For example, LAG 220 may change its configuration to use a different one of ports 206-1 and/or ports 206-2. The change in configuration may result from a planned operation or as a result of an unpredictable occurrence, for example, an automatic network event, such as a protection switching event to provide fault tolerance in network 100. Because the ports associated with a MEP may locally store frame counts for the synthetic loss measurement, a received and/or transmitted frame count for a conventional synthetic loss measurement may be lost, which may cause measurement values to be lost beyond the individual frames affected. Furthermore, a conventional synthetic loss measurement may stall or hang when a change in physical and/or logical configuration occurs at a MEP, which may involve undesirable human intervention to remediate. It is noted that such disruptions to an ongoing conventional synthetic loss measurement may occur at any MEP, either local or remote. In various network configurations (not shown), MEPs may be instantiated at a network interface (i.e., a line card) and/or a network element. For example, in an equipment protection configuration, a first line card may be paired with a second line card at a given local network element, while a local MEP is instantiated on both the first line card and the second line card. A remote MEP may be instantiated in this case at a remote line card on a remote network element. The first and second line cards may be coupled to a cross connection, for example, using a switch fabric that enables automatic switchover to the second line card when the first line card fails. Similarly, two network elements (e.g., a primary and a backup) may instantiate a MEP, for example, when the two network elements comprise a portion of a LAG, such that the LAG is protected from failure of the primary network element by automatic switchover to the backup network element.

As will be described in further detail, the novel methods and systems disclosed herein for performing synthetic loss measurements using session numbers have been invented to overcome such disadvantages and enable continuation of synthetic loss measurements with accurate results when either planned or automatic network configuration changes occur in network 100.

Figure 3:
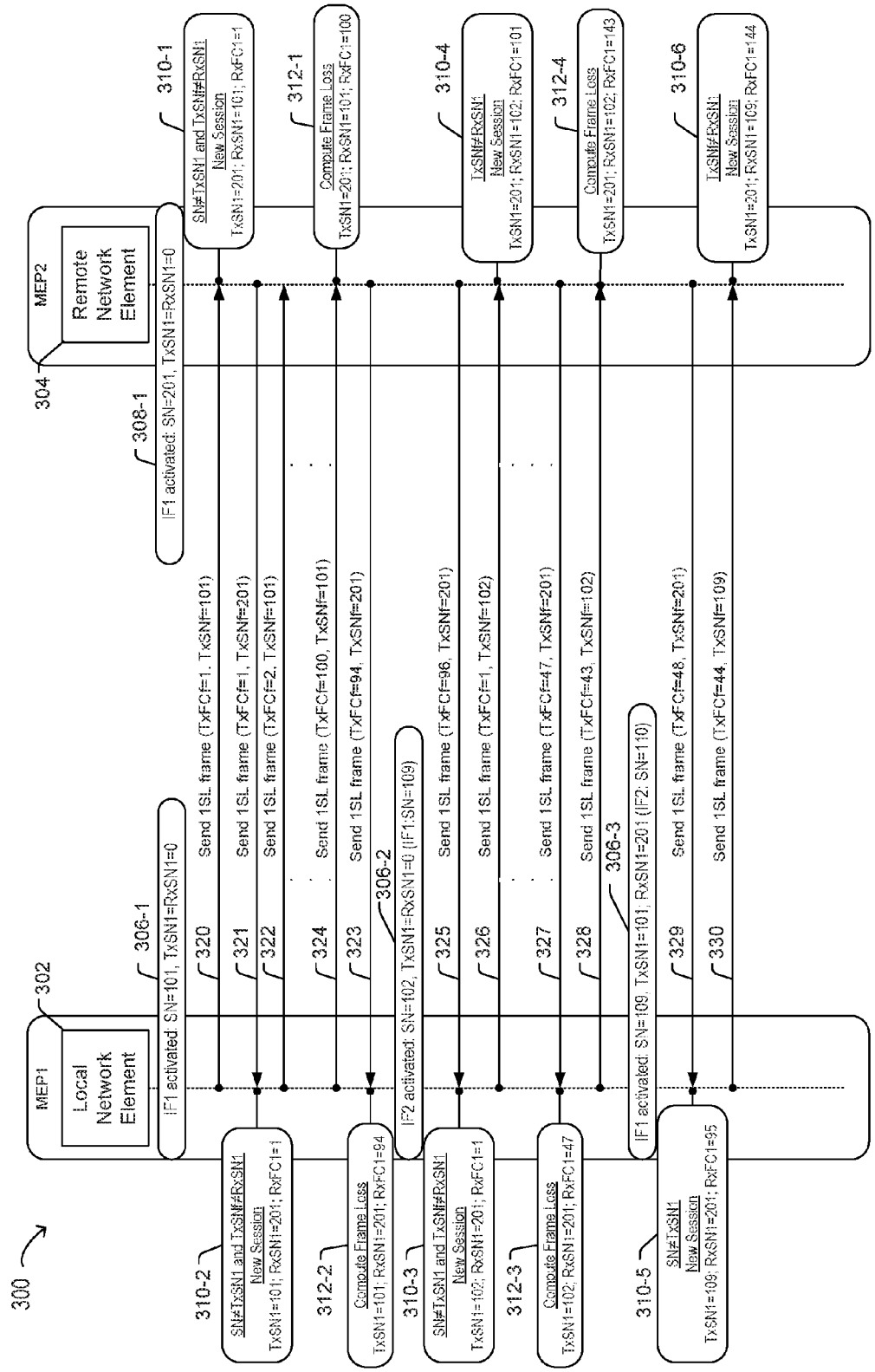
FIG. 3 is a transaction diagram of selected elements of an embodiment of a method for dual-ended synthetic loss measurements.

Referring now to FIG. 3, a transaction diagram of selected elements of an embodiment of method 300 for dual-ended synthetic loss measurements is depicted. The transaction diagram in FIG. 3 depicts dual-ended synthetic loss measurements between local network element 302 (which may include an instantiation of MEP1) and remote network element 304 (which may include an instantiation of MEP2), and illustrates actions at each MEP as well as transactions (i.e., communications) transmitted and received between MEP1 and MEP2 where time advances in the downward direction. Method 300 may be performed using network segment 200 (see FIG. 2). It is noted that certain operations described in method 300 may be optional or may be rearranged in different embodiments. Method 300 may depict aspects of dual-ended synthetic loss measurements described below with respect to FIGS. 5A-5C. Symbols that may be used with respect to method 300 are defined in Table 1 below.

TABLE 1

Symbols used in dual-ended synthetic loss measurements (FIG. 3)

| Symbol (or Variable) Name | Definition |
| --- | --- |
| SN | a current and unique session number specific to an interface at a MEP |
| TxSN1 | the transmitting session number for an interface at a MEP |
| RxSN1 | the receiving session number for an interface at a MEP |
| TxFC1 | a transmitted frame count for an interface at a MEP |
| RxFC1 | a received frame count for an interface at a MEP |
| TxFCf | a transmitted frame count sent with a 1SL synthetic frame |
| TxSNf | a transmitting session number sent with a 1SL synthetic frame |

Dual-ended SLM may be performed according to the methods described herein using an SLM protocol, which may comprise certain rules and/or specific actions. In dual-ended SLM, MEP1 may send 1SL synthetic frames to MEP2 in one direction, while MEP2 may send 1SL synthetic frames in the other direction. When a MEP sends a 1SL synthetic frame, the sending MEP includes the current session number (SN) in an organization specific type, length, value (TLV) field of the 1SL synthetic frame, TxSNf. In other words, a MEP may copy SN to TxSNf in the 1SL synthetic frame. (After a new session is initiated, the MEP may copy TxSN1 to TxSNf in the 1SL synthetic frame.) Both MEP1 and MEP2 maintain two local symbols, TxSN1 and RxSN1 which are initialized to zero. When the MEP receives a 1SL synthetic frame, the session conditions for dual-ended SLM, which may cause a new session to be initiated, are evaluated. The session conditions for dual-ended SLM may include at least one of the following session conditions:

Does SN not equal TxSN1? (i.e., local interface change?); and

Does TxSNf from the incoming 1SL synthetic frame not equal RxSN1? (i.e., remote interface change?).

When at least one of the session conditions is true, a new session is started by copying SN to TxSN1 and copying TxSNf from the incoming 1SL synthetic frame to RxSN1. In this manner, both the transmitting session number indicative of a local network interface as well as the receiving session number indicative of the remote network interface are updated. It is noted that values for TxFC1 and/or RxFC1 may or may not be reset when a new session is initiated. Computing frame loss at a receiver of a 1SL synthetic frame may include calculating a frame loss parameter, such as a number of lost frames or a percentage of lost frames, for a given session (i.e., based on identical values for TxSN1, RxSN1), measurement period, and/or test identification, for example.

In FIG. 3, method 300 may begin by activating (operation 306-1) interface IF1 at local network element 302 (MEP1) and activating (operation 308-1) interface IF1 at remote network element 304 (MEP2). In operation 306-1, interface IF1 at local network element 302 stores the following values: SN=101 and TxSN1=RxSN1=0. In operation 308-1, interface IF1 at local network element 304 stores the following values: SN=201 and TxSN1=RxSN1=0. Then, a 1SL synthetic frame is sent (operation 320) from MEP1 to MEP2 with the values: TxFCf=1 and TxSNf=101. Upon receipt of the 1SL synthetic frame in operation 320, a new session is initiated (operation 310-1) at MEP2, because both session conditions are found to be true and MEP2 stores the values: TxSN1=201, RxSN1=101, and RxFC1=1. MEP2 may send (operation 321) a 1SL synthetic frame to MEP1 with the values: TxFCf=1 and TxSNf=201. Upon receipt of the 1SL synthetic frame in operation 321, a new session is initiated (operation 310-2) at MEP1, because both session conditions are found to be true and MEP1 stores the values: TxSN1=101, RxSN1=201, and RxFC1=1. Immediately after operation 320, MEP1 may send (operation 322) a 1SL synthetic frame to MEP2 with the values: TxFCf=2 and TxSNf=101. MEP1 may continue sending 1SL synthetic frames to MEP2 while incrementing TxFC1 (not shown) for each 1SL synthetic frame sent and sending this value as TxFCf in each successive 1SL synthetic frame. After sending 98 additional 1SL synthetic frames (not shown), MEP1 may send (operation 324) a 1SL synthetic frame to MEP2 with the values: TxFCf=100 and TxSNf=101. MEP2 may compute (operation 312-1) frame loss (i.e., calculate a frame loss parameter) for the session given by TxSN1=201 and RxSN1=101 with received frame count RxFC1=100. MEP2 may continue computing frame loss (not shown) for this session until a new session is initiated at MEP2 (see operation 310-4).

Then in FIG. 3, at some later time, MEP2 may send (operation 323) a 1SL synthetic frame to MEP1 with the values: TxFCf=94 and TxSNf=201. It is noted that the frame counts for dual-ended SLM in each direction are independent of each other. MEP1 may compute (operation 312-2) frame loss (i.e., calculate a frame loss parameter) for the session given by TxSN1=101 and RxSN1=201 with received frame count RxFC1=94. Then, IF2 may be activated (operation 306-2) on MEP1, while IF1 is deactivated (operation 306-2) but remains in place and powered on and continues to locally store TxFC1 and RxFC1. Operation 306-2 may include setting SN=102 for IF2 on MEP1, setting TxSN1=RxSN1=0, and setting SN=109 for IF1 on MEP1. At some later time, MEP2 may send (operation 325) a 1SL synthetic frame to MEP1 with the values: TxFCf=96 and TxSNf=201. Although from the value of TxFCf it may be inferred that a 1SL synthetic frame from MEP2 to MEP1 corresponding to TxFCf=95 was lost (not shown), the dual-ended SLM may continue irrespectively and may result in accurate frame loss measurements. Upon receipt of the 1SL synthetic frame in operation 325, a new session is initiated (operation 310-3) at MEP1, because both session conditions are found to be true and MEP1 stores the values: TxSN1=102, RxSN1=201, and may also store RxFC1=1 when the incoming frame count is reset. In various embodiments, the incoming frame count RxFC1 may not be reset at operation 310-3, because a difference between a final frame count and an initial frame count over a measurement period may be used for SLM purposes. Then, MEP1 may send (operation 326) a 1SL synthetic frame to MEP2 with the values: TxFCf=1 and TxSNf=102. Upon receipt of the 1SL synthetic frame in operation 326, a new session is initiated (operation 310-4) at MEP2, because one session condition is found to be true and MEP2 stores the values: TxSN1=201, RxSN1=102, and may also store RxFC1=101 when the incoming frame count is not reset. The incoming frame count (RxFC1) may not need to be reset to 1 in operation 310-4 because a difference between a final frame count and an initial frame count over a measurement period may be used for SLM purposes. In other embodiments (not shown), the incoming frame count RxFC1 may be reset at operation 310-4. At some later time, MEP2 may send (operation 327) a 1SL synthetic frame to MEP1 with the values: TxFCf=47 and TxSNf=201. MEP1 may compute (operation 312-3) frame loss (i.e., calculate a frame loss parameter) for the session given by TxSN1=102 and RxSN1=201 with received frame count RxFC1=47. At some later time, MEP1 may send (operation 328) a 1SL synthetic frame to MEP2 with the values: TxFCf=43 and TxSNf=102. MEP2 may compute (operation 312-4) frame loss (i.e., calculate a frame loss parameter) for the session given by TxSN1=201 and RxSN1=102 with received frame count RxFC1=143.

Finally, in FIG. 3, IF1 may be reactivated (operation 306-3) on MEP1, while IF2 is deactivated (operation 306-3). Operation 306-3 may include setting SN=110 for IF2 on MEP1. It is noted that SN=109, TxSN1=101, and RxSN1=201 may be retained at IF1 upon reactivation in operation 306-3. Then, MEP2 may send (operation 329) a 1SL synthetic frame to MEP1 with the values: TxFCf=48 and TxSNf=201. Upon receipt of the 1SL synthetic frame in operation 329, a new session is initiated (operation 310-5) at MEP1, because one session condition is found to be true and MEP1 stores the values: TxSN1=109, RxSN1=201, and RxFC1=95. Note that the value for RxFC1 is retained from a previous session initiated in operation 310-2 for IF1 and may not be reset to 1. Because computing frame loss in operation 312 involves subtracting a final received frame count from an initial received frame count for a given measurement period for a given session, the computed difference of frame loss remains correct. Then, MEP1 may send (operation 330) a 1SL synthetic frame to MEP2 with the values: TxFCf=44 and TxSNf=109. Upon receipt of the 1SL synthetic frame in operation 330, a new session is initiated (operation 310-6) at MEP2, because one session condition is found to be true and MEP2 stores the values: TxSN1=201, RxSN1=109, and may also store RxFC1=144 when the incoming frame count is not reset. The incoming frame count (RxFC1) may not need to be reset to 1 in operation 310-6 because a difference between a final frame count and an initial frame count over a measurement period may be used for SLM purposes. In other embodiments (not shown), the incoming frame count RxFC1 may be reset at operation 310-6.

Figure 4:
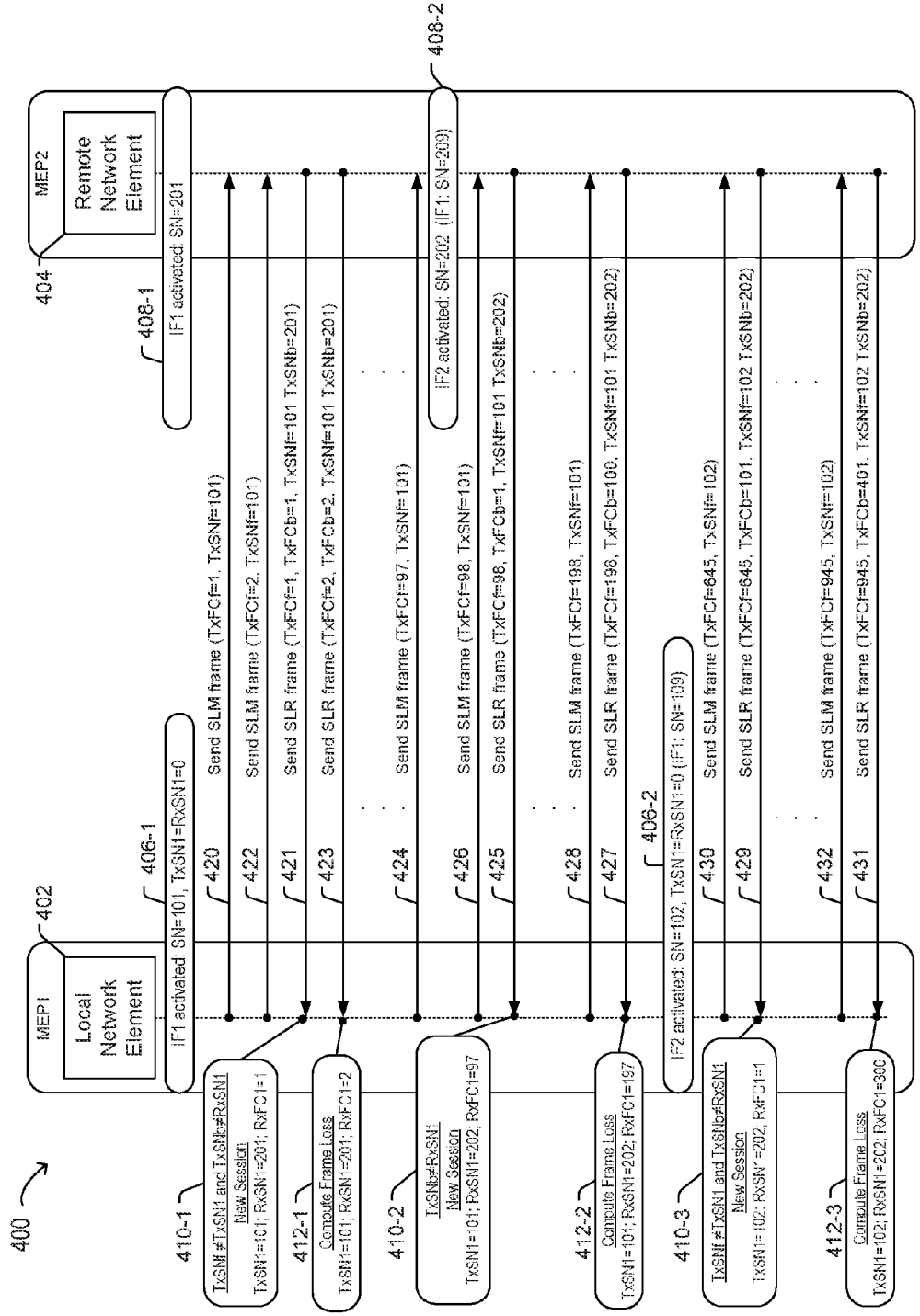
FIG. 4 is a transaction diagram of selected elements of an embodiment of a method for single-ended synthetic loss measurements.

Referring now to FIG. 4, a transaction diagram of selected elements of an embodiment of method 400 for single-ended synthetic loss measurements is depicted. The transaction diagram in FIG. 4 depicts single-ended synthetic loss measurements between local network element 402 (which may include an instantiation of MEP1) and remote network element 404 (which may include an instantiation of MEP2), and illustrates actions at each MEP as well as communications transmitted and received between MEP1 and MEP2 where time advances in the downward direction. Method 400 may be performed using network segment 200 (see FIG. 2). It is noted that certain operations described in method 400 may be optional or may be rearranged in different embodiments. Method 400 may depict aspects of single-ended synthetic loss measurements described below with respect to FIGS. 6A-6C. Symbols that may be used with respect to method 400 are defined in Table 2 below.

TABLE 2

Symbols used in single-ended synthetic loss measurements (FIG. 4)

| Symbol (or Variable) Name | Definition |
|---|---|
| SN | a current and unique session number specific to an interface at a MEP |
| TxSN1 | the transmitting session number for an interface at a MEP |
| RxSN1 | the receiving session number for an interface at a MEP |
| TxFC1 | a transmitted frame count for an interface at a MEP |
| RxFC1 | a received frame count for an interface at a MEP |
| TxFCf | a frame count for a synthetic message sent with the synthetic message and with a synthetic response |
| TxSNf | a transmitting session number for a synthetic message sent with the synthetic message and with a synthetic response |
| TxFCb | a frame count for a synthetic response send with the synthetic response |
| TxSNb | a transmitting session number for a synthetic response sent with the synthetic response |

Single-ended SLM may be performed according to the methods described herein using an SLM protocol, which may comprise certain rules and/or specific actions. Although single-ended SLM may be performed by any MEP, for descriptive clarity in FIG. 4, MEP1 is the single end that sends synthetic messages, receives synthetic responses, and computes frame loss. In single-ended SLM, MEP1 may send a synthetic message to MEP2 in one direction, while MEP2 may respond to the synthetic message by sending a synthetic response in the other direction back to MEP1. When MEP1 sends a synthetic message, MEP1 includes the current session number (SN) in an organization specific type, length, value (TLV) field of the synthetic message, TxSNf. In other words, a MEP may copy SN to TxSNf in the synthetic message. (After a new session is initiated, the MEP may copy TxSN1 to TxSNf in the synthetic message.) When MEP2 responds to the synthetic message by sending back a synthetic response, MEP2 copies TxSNf from the synthetic message to the synthetic response. MEP1 maintains two local symbols, TxSN1 and RxSN1 which are initialized to zero. When MEP1 receives a synthetic response, the session conditions for single-ended SLM, which may cause a new session to be initiated, are evaluated. The session conditions for single-ended SLM may include at least one of the following session conditions:

Does TxSNf not equal TxSN1? (i.e., local interface change?); and

Does TxSNb not equal RxSN1? (i.e., remote interface change?).

When at least one of the session conditions is true, a new session is started by copying TxSNf to TxSN1 and copying TxSNb to RxSN1. In this manner, both the transmitting session number indicative of a local network interface (MEP1) as well as the receiving session number indicative of a remote network interface (MEP2) are updated. It is noted that values for TxFC1 and/or RxFC1 may or may not be reset when a new session is initiated. Computing frame loss at MEP1 may include calculating a frame loss parameter, such as a number of lost frames or a percentage of lost frames for a given session (i.e., based on identical values for TxSN1, RxSN1), measurement period, and/or test identification, for example.

In FIG. 4, method 400 may begin by activating (operation 406-1) interface IF1 at local network element 402 (MEP1)

and activating (operation 408-1) interface IF1 at remote network element 404 (MEP2). In operation 406-1, interface IF1 at local network element 402 stores the following values: SN=101 and TxSN1=RxSN1=0. In operation 408-1, interface IF1 at local network element 404 stores the following values: SN=201. Then, a synthetic message is sent (operation 420) from MEP1 to MEP2 with the values: TxFCf=1 and TxSNf=101. MEP1 may send (operation 422) a synthetic message to MEP2 with the values: TxFCf=2 and TxSNf=101. Upon receipt of the synthetic message in operation 420, MEP2 generates and sends (operation 421) a synthetic response with the values: TxFCf=1, TxFCb=1, TxSNf=101, and TxSNb=201. Upon receipt of the synthetic response in operation 421, a new session is initiated (operation 410-1) at MEP1, because both session conditions are found to be true and MEP1 stores the values: TxSN1=101, RxSN1=201, and RxFC1=1. Upon receipt of the synthetic message in operation 422, MEP2 generates and sends (operation 423) a synthetic response with the values: TxFCf=2, TxFCb=2, TxSNf=101, and TxSNb=201. MEP1 may compute (operation 412-1) frame loss (i.e., calculate a frame loss parameter) for the session given by TxSN1=101 and RxSN1=201 with received frame count RxFC1=2. After some time, MEP1 may send (operation 424) a synthetic message to MEP2 with the values: TxFCf=97 and TxSNf=101. Then, before MEP2 may generate a synthetic response to the synthetic message sent in operation 424, IF1 may be deactivated (operation 408-2) on MEP2, while IF2 is activated (operation 408-2) on MEP2. Operation 408-2 may include setting SN=202 for IF1 on MEP2 and setting SN=209 for IF1 on MEP2. MEP1 may then send (operation 426) a synthetic message to MEP2 with the values: TxFCf=98 and TxSNf=101. Upon receipt of the synthetic message in operation 426, MEP2 generates and sends (operation 425) a synthetic response with the values: TxFCf=98, TxFCb=1, TxSNf=101, and TxSNb=202. Upon receipt of the synthetic response in operation 425, a new session is initiated (operation 410-2) at MEP1, because one session condition is found to be true and MEP1 stores the values: TxSN1=101, RxSN1=202, and RxFC1=97. After some time, MEP1 may send (operation 428) a synthetic message to MEP2 with the values: TxFCf=198 and TxSNf=101. Upon receipt of the synthetic message in operation 428, MEP2 generates and sends (operation 427) a synthetic response with the values: TxFCf=198, TxFCb=100, TxSNf=101, and TxSNb=202. MEP1 may compute (operation 412-2) frame loss (i.e., calculate a frame loss parameter) for the session given by TxSN1=101 and RxSN1=202 with received frame count RxFC1=197. Then, IF1 may be deactivated (operation 406-2) on MEP1, while IF2 is activated (operation 406-2) on MEP1. Operation 406-2 may include setting SN=102 for IF2 on MEP1, setting TxSN1=RxSn1=0 for IF2 on MEP1, and setting SN=109 for IF1 on MEP1. Then, MEP1 may send (operation 430) a synthetic message to MEP2 with the values: TxFCf=645 and TxSNf=102. Upon receipt of the synthetic message in operation 430, MEP2 generates and sends (operation 429) a synthetic response with the values: TxFCf=645, TxFCb=101, TxSNf=102, and TxSNb=202. Upon receipt of the synthetic response in operation 429, a new session is initiated (operation 410-3) at MEP1, because both session conditions are found to be true and MEP1 stores the values: TxSN1=102, RxSN1=202, and may also store RxFC1=1 when the incoming frame count is reset. In various embodiments, the incoming frame count RxFC1 may not be reset at operation 410-3, because a difference between a final frame count and an initial frame count over a measurement period may be used for SLM purposes. It is noted that TxFCf may represent a value that IF2 previously retained (not shown) in a local memory that was not reset in operation 406-2, while TxFCb may represent a received synthetic message count RxFC1 (not shown) at MEP2. After some time, MEP1 may send (operation 432) a synthetic message to MEP2 with the values: TxFCf=945 and TxSNf=102. Upon receipt of the synthetic message in operation 432, MEP2 generates and sends (operation 431) a synthetic response with the values: TxFCf=945, TxFCb=401, TxSNf=102, and TxSNb=202. MEP1 may compute (operation 412-3) frame loss (i.e., calculate a frame loss parameter) for the session given by TxSN1=102 and RxSN1=202 with received frame count RxFC1=300.

Figure 5A:
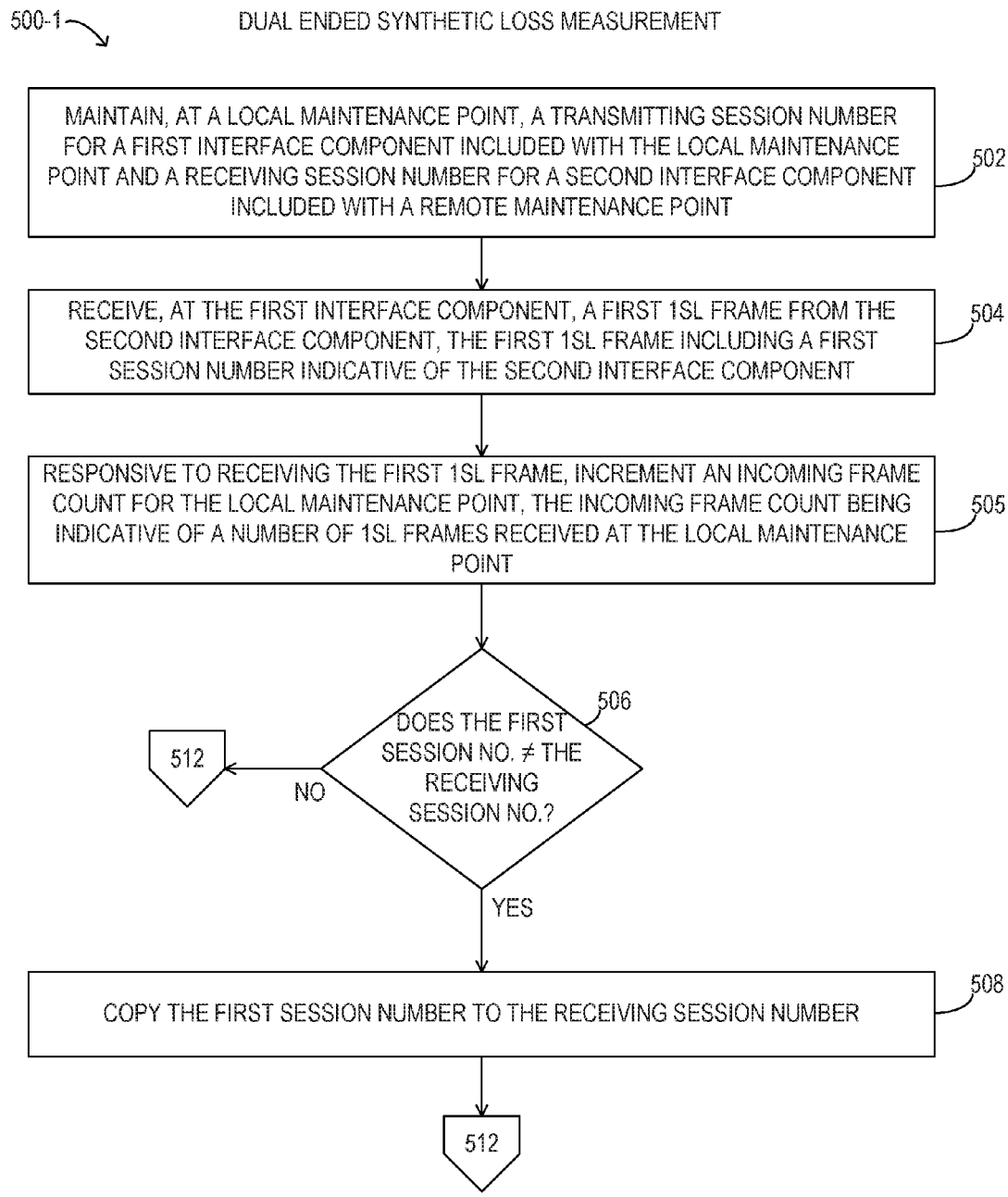
FIGS. 5A-5C are flowcharts depicting selected elements of an embodiment of a method for dual-ended synthetic loss measurement.
Figure 5B:
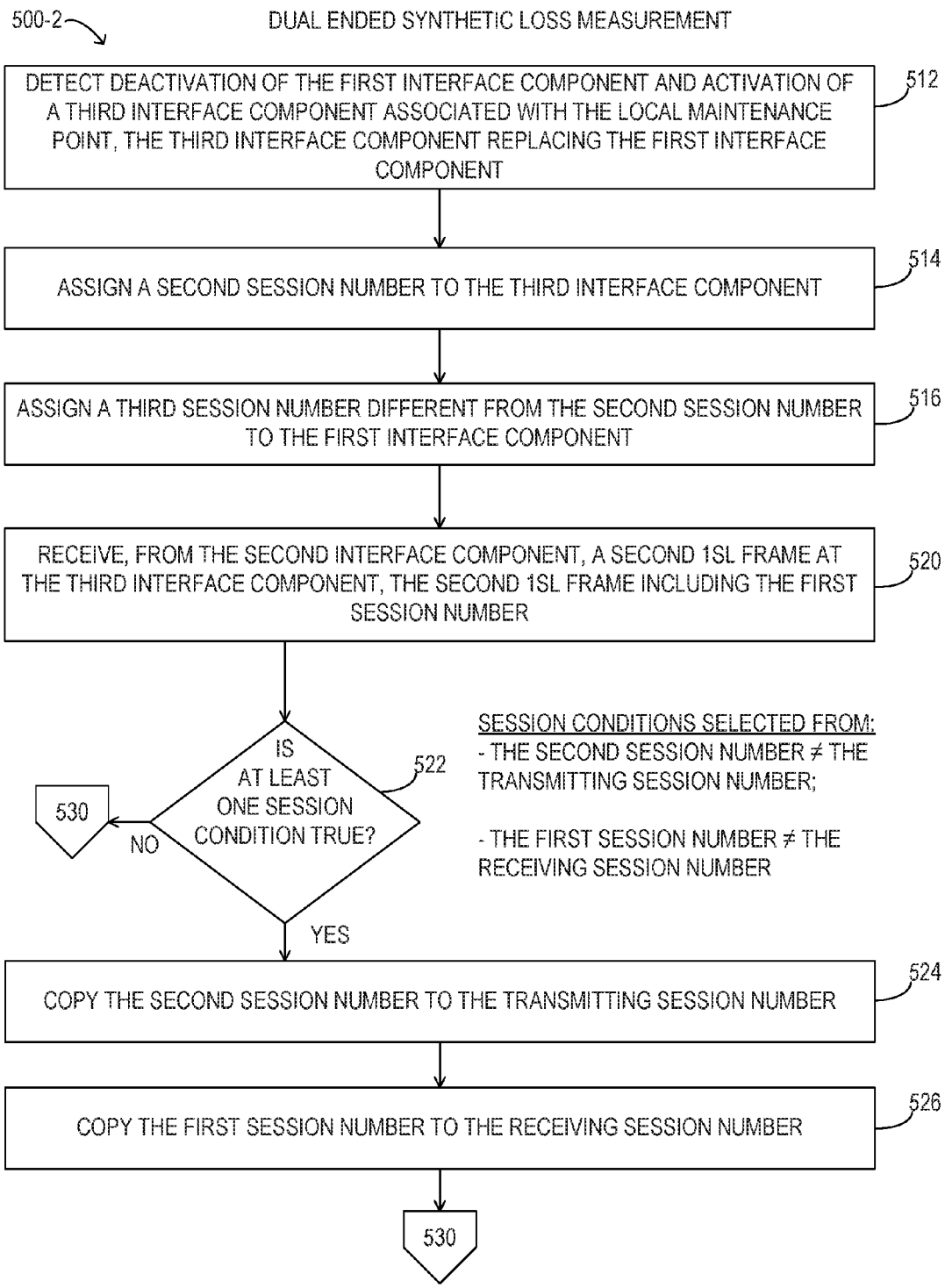
Figure 5C:
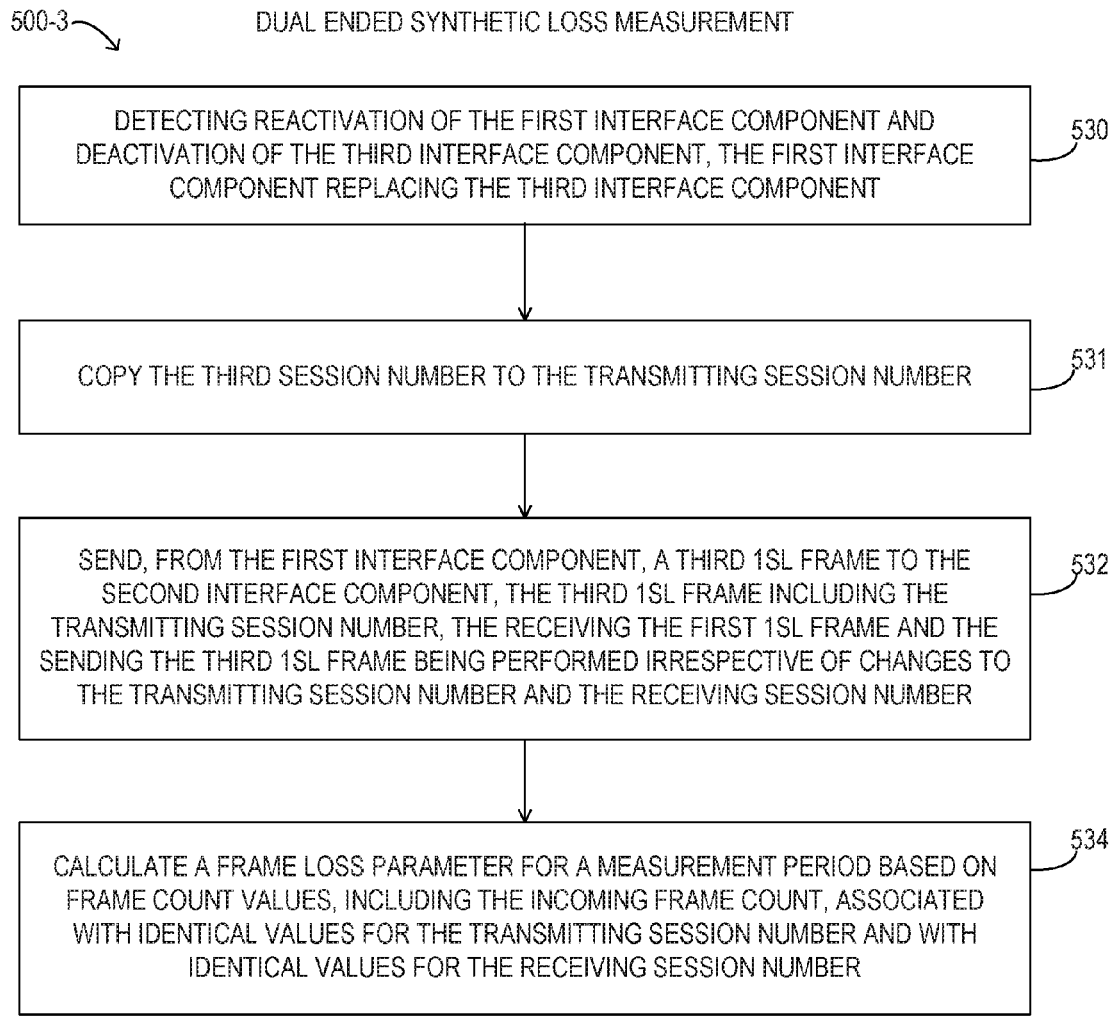

Turning now to FIGS. 5A, 5B, and 5C, a block diagram of selected elements of an embodiment of method 500 for dual-ended synthetic loss measurements is depicted in flowchart form. Method 500 may be performed using network segment 200 (see FIG. 2). It is noted that certain operations described in method 500 may be optional or may be rearranged in different embodiments. Dual-ended synthetic loss measurements (DE-SLM) may involve unidirectional transmission of a one-way synthetic loss message (1SL, also referred to herein as an instance of a "synthetic frame" or simply, a "1SL frame") between two maintenance points (i.e., MEPs). In dual-ended synthetic loss measurements, the receiver keeps track of the frame count and may calculate a frame loss parameter for characterizing frame loss during a measurement period. It is noted that dual-ended SLM may be performed in both directions simultaneously on a given network channel, such that each MEP of the network channel measures frame loss as a receiver in one direction.

In FIG. 5A, method 500-1 may begin by maintaining (operation 502), at a local maintenance point, a transmitting session number for a first interface component included with the local maintenance point and a receiving session number for a second interface component included with a remote maintenance point. The local maintenance point and the remote maintenance point may be represented by maintenance points 212-1, 212-2 (either singly or in combination) and maintenance point 212-6, as shown in FIG. 2. At the first interface component, a first 1SL frame may be received (operation 504) from the second interface component, the first synthetic frame including a first session number indicative of the second interface component. Responsive to receiving the first 1SL frame in operation 504, an incoming frame count for the local maintenance point may be incremented (operation 505), the incoming frame count being indicative of a number of 1SL frames received at the local maintenance point. Then in method 500-1, a decision may be made whether the first session number does not equal (operation 506) the receiving session number. The evaluation in operation 506 may be indicative of a configuration change at the remote maintenance point, such as a protection switch event. When the result of operation 506 is NO, method 500-1 may advance to operation 512 (see FIG. 5B, method 500-2). When the result of operation 506 is YES, method 500-1 may copy the first session number to the receiving session number (operation 508). In certain embodiments, an incoming frame count for the local maintenance point may be reset in conjunction with operation 508 (not shown). After operation 508, method 500 may continue with operation 512 in method 500-2 in FIG. 5B.

Advancing now to FIG. 5B, method 500-2 may continue method 500 by detecting (operation 512) deactivation of the first interface component and activation of a third interface component associated with the local maintenance point, the third interface component replacing the first interface component. It is noted that the deactivation and/or activation in operation 512 may involve a 'soft' or logical deactivation, such that the first interface component remains installed and powered on and may retain certain locally stored values, such as a transmitted and/or a received frame count, and/or other state information with respect to an ongoing synthetic loss measurement. The replacement in operation 512 may also include a 'hard' deactivation and/or activation where the first interface component is physically removed and powered down, thereby losing any locally stored values and/or state information with respect to an ongoing synthetic loss measurement. A second session number may be assigned (operation 514) to the third interface component. A third session number different from the second session number may be assigned (operation 516) to the first interface component. The third session number may be pre-assigned in operation 516 to prevent conflicts with the second session number and to prepare the first interface component for reactivation at a later time, without creating errors in an ongoing SLM. A second 1SL frame may be received (operation 520) from the second interface component, the second 1SL frame including the first session number. Then, a decision may be made (operation 522), whether at least one session condition is true. The session conditions may be selected from: (a) does the second session number not equal the transmitting session number?; and (b) does the first session number not equal the receiving session number? When the result of operation 522 is NO, method 500 may continue with operation 530 in method 500-3 (see FIG. 5C). When the result of operation 522 is YES, the second session number may be copied (operation 524) to the transmitting session number and the first session number may be copied (operation 526) to the receiving session number. After operation 526, method 500 may continue with operation 530 in method 500-3 in FIG. 5C.

Advancing now to FIG. 5C, method 500-3 may continue method 500 by detecting reactivation (operation 530) the first interface component and deactivation of the third interface component. The third session number may be copied (operation 531) to the transmitting session number. It is noted that the first interface component may be reactivated either with or without statefulness with regard to a previously ongoing synthetic loss measurement session that the first interface component was performing. A third 1SL frame may be sent (operation 532) from the first interface component, the third 1SL frame including the transmitting session number, the receiving the first 1SL frame and the sending the third 1SL frame being performed irrespective of changes to the transmitting session number and the receiving session number. In other words, dual-ended synthetic loss measurements may continue without significant error in method 500 regardless of a configuration change, such as a protection switch event in the network segment between the local maintenance point and the remote maintenance point (see also FIG. 3). A frame loss parameter may be calculated (operation 534) for a measurement period based on frame count values, including the incoming frame count, associated with identical values for the transmitting session number and with identical values for the receiving session number. The calculation described in operation 534 enables accurate values for frame loss irrespective of configuration changes at the local and/or remote maintenance points, and enables synthetic loss measurements to continue when configuration changes, such as protection switch events, occur. In certain embodiments, a test identification parameter (e.g., TestID) may additionally be used to specify a plurality of concurrent SLM sessions, each further correlated using an identical value for the test identification parameter.

Figure 6A:
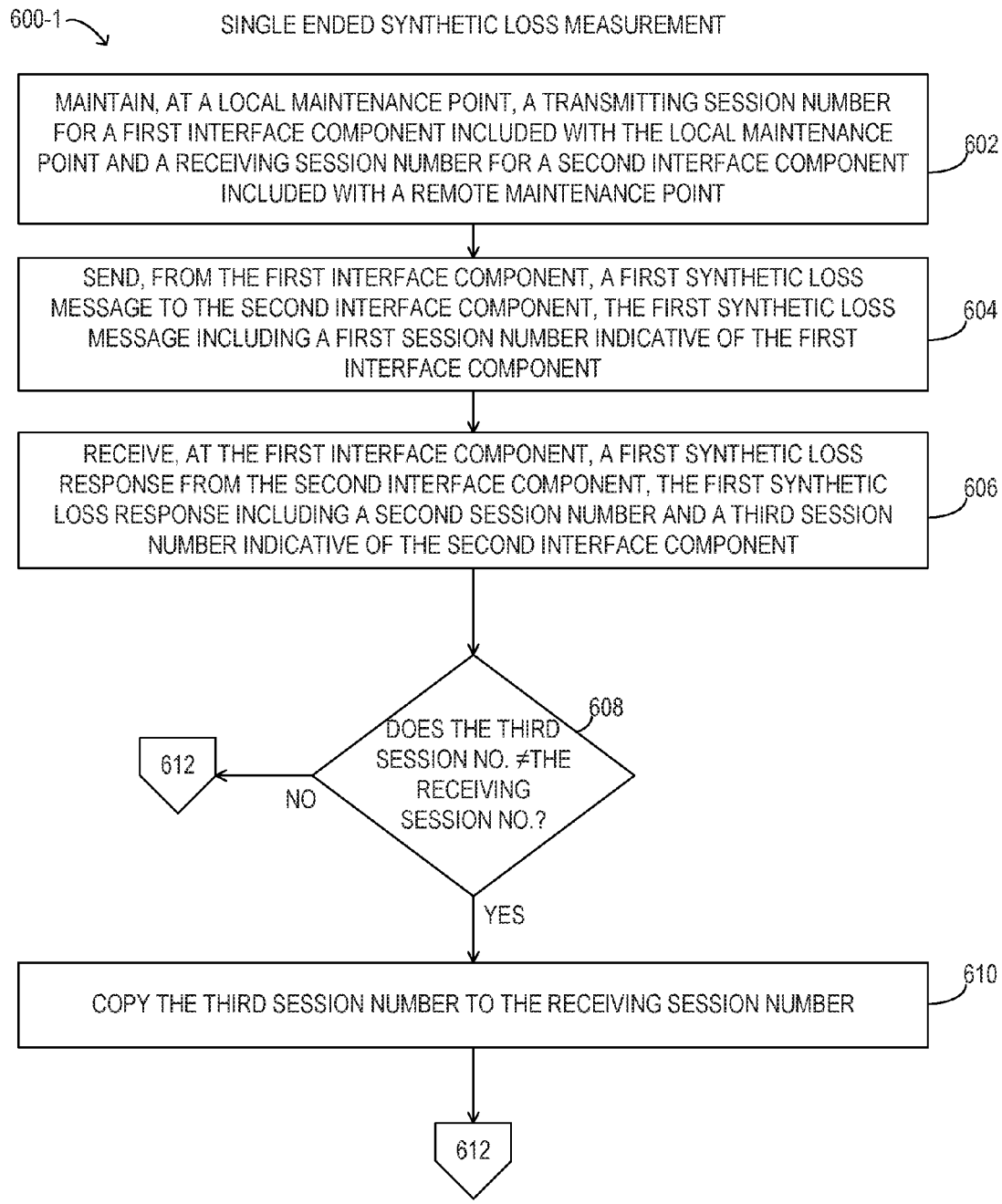
FIGS. 6A-6C are flowcharts depicting selected elements of an embodiment of a method for single-ended synthetic loss measurement.
Figure 6B:
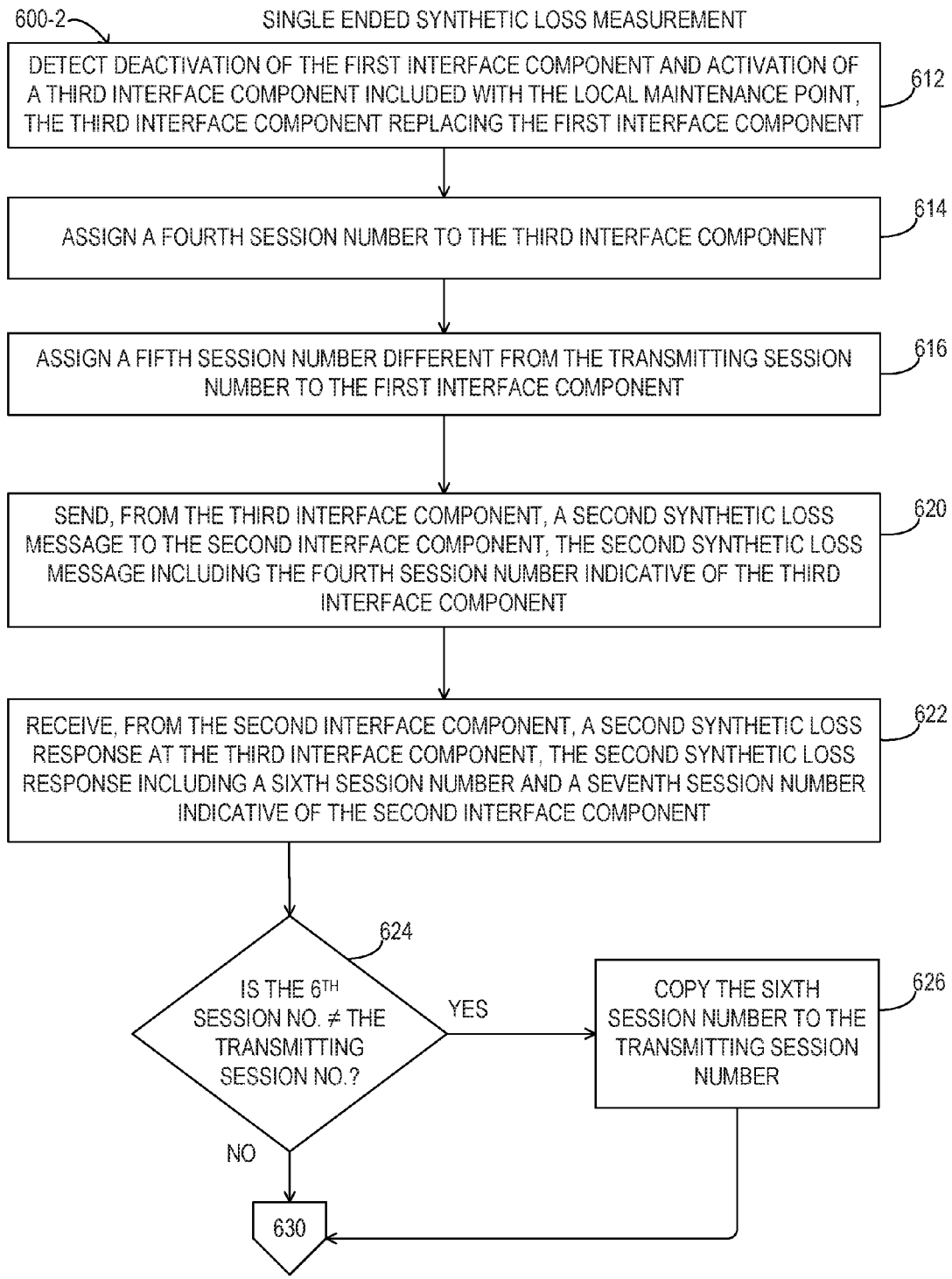
Figure 6C:
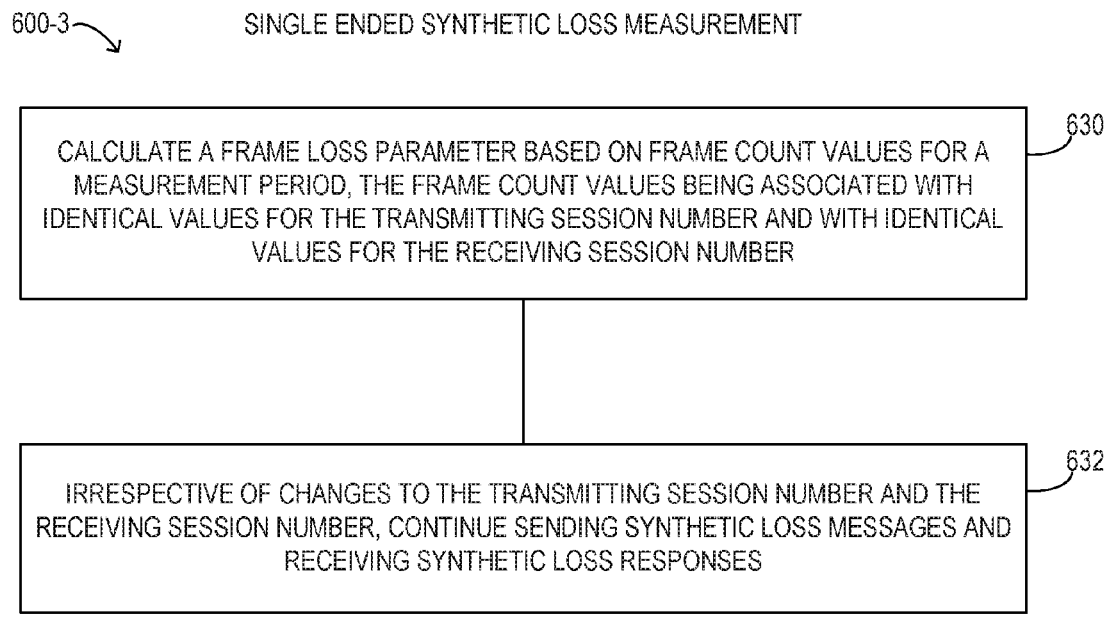

Turning now to FIGS. 6A, 6B, and 6C, a block diagram of selected elements of an embodiment of method 600 for single-ended synthetic loss measurements is depicted in flow-chart form. Method 600 may be performed using network segment 200 (see FIG. 2). It is noted that certain operations described in method 600 may be optional or may be rearranged in different embodiments. Single-ended synthetic loss measurements (SE-SLM) may involve transmission of a synthetic loss message (also referred to as SLM) between at least two maintenance points (i.e., MEPs), and, in response, a return transmission of a synthetic loss response (SLR). In single-ended synthetic loss measurements, the receiver keeps track of the frame counts sent and received and may calculate a frame loss parameter for characterizing frame loss during a measurement period. It is noted that single-ended synthetic loss measurements may be performed by sending a synthetic loss message to at least one remote MEP and receiving corresponding responses from the remote MEP(s), such that multiple network channels may be measured for frame loss simultaneously from the local MEP (also referred to as multipoint service or multicasting).

In FIG. 6A, method 600-1 may begin by maintaining (operation 602), at a local maintenance point, a transmitting session number for a first interface component included with a local maintenance point and a receiving session number for a second interface component included with a remote maintenance point. The local maintenance point and the remote maintenance point may be represented by maintenance points 212-1, 212-2 (either singly or in combination) and maintenance point 212-6, as shown in FIG. 2. At the first interface component, a first synthetic loss message may be sent (operation 604) to the second interface component, the first synthetic loss message including a first session number indicative of the first interface component. At the first interface component, a first synthetic loss response may be received (operation 606) from the second interface component, the first synthetic loss response including a second session number and a third session number indicative of the second interface component. Then, a decision may be made (operation 608) whether the third session number does not equal the receiving session number. The decision in operation 608 may correspond to detecting a configuration change, such as a protection switch event, at the second interface component. When the result of operation 608 is NO, method 600 may continue with operation 612 in method 600-2 (see FIG. 6B). When the result of operation 608 is YES, the third session number may be copied (operation 610) to the receiving session number. After operation 610, method 600 may continue with operation 612 in method 600-2 in FIG. 6B.

Advancing now to FIG. 6B, method 600-2 may continue method 600 by detecting (operation 612) deactivation of the first interface component and activation of a third interface component associated with the local maintenance point, the third interface component replacing the first interface component. It is noted that the replacement in operation 612 may involve a 'soft' or logical deactivation, such that the first interface component remains installed and powered on and may retain certain locally stored values, such as a transmitted and/or a received frame count, and/or other state information with respect to an ongoing synthetic loss measurement. The replacement in operation 612 may also include a 'hard' deactivation where the first interface component is physically removed and powered down, thereby losing any locally stored values and/or state information with respect to an ongoing synthetic loss measurement. A fourth session number may be assigned (operation 614) to the third interface component. A fifth session number different from the transmitting session number may be assigned (operation 616) to the first interface component. The fifth session number may be pre-assigned in operation 616 to prevent conflicts with the fourth session number and to prepare the first interface component for reactivation at a later time, without creating errors in an ongoing synthetic loss measurement. A second synthetic loss message may be sent (operation 620) from the third interface component to the second interface component, the second synthetic message including the fourth session number indicative of the third interface component. A second synthetic loss message may be received (operation 622) from the second interface component, the second synthetic loss response including a sixth session number and a seventh session number indicative of the second interface component. Then, a decision may be made (operation 624) whether the sixth session number does not equal the transmitting session number. When the result of operation 624 is NO, method 600 may continue with operation 630 in method 600-3 (see FIG. 6C). When the result of operation 624 is YES, the sixth session number may be copied (operation 626) to the transmitting session number. After operation 626, method 600 may continue with operation 630 in method 600-3 in FIG. 6C.

Advancing now to FIG. 6C, method 600-3 may continue method 600 by calculating (operation 630) a frame loss parameter based on frame count values for a measurement period, the frame count values being associated with identical values for the transmitting session number and with identical values for the receiving session number. Irrespective of changes to the transmitting session number and the receiving session number, method 600 may continue (operation 632) sending synthetic messages and receiving synthetic responses.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing single-ended synthetic loss measurements, comprising:
    maintaining, at a local maintenance point, a transmitting session number for a first interface component associated with the local maintenance point and a receiving session number for a second interface component associated with a remote maintenance point;
    sending, from the first interface component, a first synthetic loss message to the second interface component, wherein the first synthetic loss message includes a first session number indicative of the first interface component;
    receiving, at the first interface component, a first synthetic loss response from the second interface component, wherein the first synthetic loss response includes a second session number and a third session number indicative of the second interface component;
    when the third session number does not equal the receiving session number, copying the third session number to the receiving session number; and
    responsive to detecting deactivation of the first interface component and activation of a third interface component associated with the local maintenance point, wherein the third interface component replaces the first interface component, the method further comprising:
        assigning a fourth session number to the third interface component; and
        assigning a fifth session number to the first interface component,
        wherein the fourth session number and the fifth session number are different from the transmitting session number.

2. The method of claim 1, further comprising: sending, from the third interface component, a second synthetic loss message to the second interface component, wherein the second synthetic loss message includes the fourth session number indicative of the third interface component; and responsive to receiving, from the second interface component, a second synthetic loss response at the third interface component, wherein the second synthetic loss response includes a sixth session number and a seventh session number indicative of the second interface component, and when the sixth session number does not equal the transmitting session number, copying the sixth session number to the transmitting session number.

3. The method of claim 1, further comprising:
    calculating a frame loss parameter based on frame count values for a measurement period, wherein the frame count values used to calculate the frame loss parameter are associated with identical values for the transmitting session number and with identical values for the receiving session number.

4. The method of claim 3, wherein the frame count values used to calculate the frame loss parameter are associated with identical values for a test identification parameter.

5. The method of claim 1, wherein the sending the first synthetic loss message and the receiving the first synthetic loss response are performed irrespective of changes to the transmitting session number and the receiving session number.

6. The method of claim 1, wherein the first synthetic loss message includes the first session number in an organization-specific type, length, and value (TLV) field in accordance with the International Telecommunication Union (ITU) Y.1731 standard, and
    wherein the first synthetic loss response respectively includes each of the second session number and the third session number in an organization-specific type, length, and value (TLV) field in accordance with the International Telecommunication Union (ITU) Y.1731 standard.

7. The method of claim 1, wherein the sending, from the first interface component, the first synthetic loss message includes sending the first synthetic loss message to a plurality of interface components associated with a respective plurality of remote maintenance points, the plurality of interface components including the second interface component.

8. The method of claim 1, wherein a network segment transmitting the first synthetic loss message between the first interface component and the second interface component includes at least one link aggregation group (LAG).

9. A system for performing single-ended synthetic loss measurements, comprising:
    a processor configured to access non-transitory computer readable memory media, wherein the memory media store processor-executable instructions, the instructions, when executed by a processor, cause the processor to:

maintain, at a local maintenance point, a transmitting session number for a first interface component associated with the local maintenance point and a receiving session number for a second interface component associated with a remote maintenance point;

send, from the first interface component, a first synthetic loss message to the second interface component, wherein the first synthetic loss message includes a first session number indicative of the first interface component;

receive, at the first interface component, a first synthetic loss response from the second interface component, wherein the first synthetic loss response includes a second session number and a third session number indicative of the second interface component;

when the third session number does not equal the receiving session number, copy the third session number to the receiving session number; and responsive to detecting deactivation of the first interface component and activation of a third interface component associated with the local maintenance point, wherein the third interface component replaces the first interface component, the instructions further comprising instructions to:

assign a fourth session number to the third interface component; and assign a fifth session number to the first interface component, wherein the fourth session number and the fifth session number are different from the transmitting session number.

10. The system of claim 9, wherein the memory media store instructions to: send, from the third interface component, a second synthetic loss message to the second interface component, wherein the second synthetic loss message includes the fourth session number indicative of the third interface component; and responsive to receiving, from the second interface component, a second synthetic loss response at the third interface component, wherein the second synthetic loss response includes a sixth session number and a seventh session number indicative of the second interface component, and when the sixth session number does not equal the transmitting session number, copy the sixth session number to the transmitting session number.

11. The system of claim 9, wherein the memory media store instructions to:

calculate a frame loss parameter based on frame count values for a measurement period, wherein the frame count values used to calculate the frame loss parameter are associated with identical values for the transmitting session number and with identical values for the receiving session number.

12. The system of claim 11, wherein the frame count values used to calculate the frame loss parameter are associated with identical values for a test identification parameter.

13. The system of claim 9, wherein the instructions to send the first synthetic loss message and the instructions to receive the first synthetic loss response are performed irrespective of changes to the transmitting session number and the receiving session number.

14. The system of claim 9, wherein the first synthetic loss message includes the first session number in an organization-specific type, length, and value (TLV) field in accordance with the International Telecommunication Union (ITU) Y.1731 standard, and wherein the first synthetic loss response respectively includes each of the second session number and the third session number in an organization-specific type, length, and value (TLV) field in accordance with the International Telecommunication Union (ITU) Y.1731 standard.

15. The system of claim 9, wherein the instructions to send, from the first interface component, the first synthetic loss message include instructions to send the first synthetic loss message to a plurality of interface components associated with a respective plurality of remote maintenance points, the plurality of interface components including the second interface component.

16. The system of claim 9, wherein a network segment transmitting the first synthetic loss message between the first interface component and the second interface component includes at least one link aggregation group (LAG).

* * * * *